US005228842A

United States Patent [19]

Guebeli et al.

[11] Patent Number: 5,228,842

[45] Date of Patent: Jul. 20, 1993

[54] QUICK-CHANGE FLUID SECTION FOR PISTON-TYPE PAINT PUMPS

[75] Inventors: Ferdinand N. Guebeli, Gams, Switzerland; Norman A. Cyphers, Rogers, N. Mex.

[73] Assignee: Wagner Spray Tech Corporation, Minneapolis, Minn.

[21] Appl. No.: 735,794

[22] Filed: Jul. 30, 1991

[51] Int. Cl.[5] ........................ F04B 35/00; F04B 39/10; F16J 15/16

[52] U.S. Cl. .................................... 417/360; 417/554; 277/124

[58] Field of Search ............... 417/360, 415, 545, 552, 417/553, 554; 92/151; 277/205, 58, 112, 117, 120, 124, 125, 152

[56] References Cited

U.S. PATENT DOCUMENTS

| | | | |
|---|---|---|---|
| 2,188,957 | 2/1940 | Pfauser | 277/124 |
| 2,587,405 | 2/1952 | Stevens | 277/205 |
| 2,644,701 | 7/1953 | Flick | 277/205 |
| 2,982,590 | 5/1961 | Gunning | 277/205 |
| 3,011,808 | 12/1961 | Tucker | 277/124 |
| 3,069,178 | 12/1962 | Rosen | 277/112 |
| 3,330,217 | 7/1967 | Baur | 92/168 |
| 3,351,350 | 11/1967 | Shepler | 277/58 |
| 3,502,029 | 8/1968 | Halladay | 417/360 |
| 3,827,339 | 8/1974 | Rosen et al. | 417/554 |
| 4,009,971 | 3/1977 | Krohn | 417/43 |
| 4,262,915 | 4/1981 | Williams | 277/205 |
| 4,516,752 | 5/1985 | Babbitt | 277/125 |
| 4,775,303 | 10/1988 | Liska | 417/554 |
| 4,921,407 | 5/1990 | Ponder | 417/554 |
| 5,094,596 | 3/1992 | Erwin et al. | 417/568 |

*Primary Examiner*—Richard A. Bertsch
*Assistant Examiner*—Roland McAndrews
*Attorney, Agent, or Firm*—Faegre & Benson

[57] ABSTRACT

An improved quick-change fluid section for piston-type paint pumps having a mounting flange with keyhole shaped apertures at one end and a threaded fitting at the other end to couple a fluid section housing to driving means via a slide housing. The piston and slide are retained in reciprocable driving relationship via a transverse pin held in place by a circumferential spring received in a circumferential groove on the slide. The spring and pin are accessible via diametrically opposed apertures in the mounting flange. The fluid section housing is bifurcated and has sealing means which may be either a packing set of alternating elastomeric and leather V-rings or lip-type seals. The sealing means is immediately available upon separation of the two portions of the fluid section and may be removed without the need for special tools. An inline or right angle inlet or suction fitting may be utilized with the fluid section.

12 Claims, 5 Drawing Sheets

QUICK-CHANGE FLUID SECTION FOR PISTON-TYPE PAINT PUMPS

This invention relates to the field of piston type fluid pumping devices used for high-pressure airless spraying. In the past, fluid sections for such pumping devices oftentimes required special tools for disassembly and were held together with tie bolts which, when removed, permitted all component parts to become loose items. This resulted in difficulties in servicing component parts of the fluid section in the field. In addition, prior art designs required that the fluid section use a single type of seal, typically a V-ring packing set, and thus limited adaptability of such prior art fluid sections to various service conditions. Furthermore, prior art designs had the packing set located in an annular recess which was relatively inaccessible by being axially remote within the pump even when the housing was disassembled. Such designs typically required special, not widely available tools to remove the packing set.

The present invention overcomes deficiencies of the prior art by providing for a quick-change fluid section which allows for disassembly of only the component in the fluid section requiring servicing, and does so without the need for special tools, and furthermore permits the same fluid section to utilize either a V-ring type packing set or a "U" cup or lip type seal, depending upon service and life requirements. The present design makes the packing set or seal immediately available upon disassembly of the two portions of the fluid section housing.

BRIEF DESCRIPTION OF THE DRAWINGS

FIG. 5 is an end view of the flange of FIG. 3.

DETAILED DESCRIPTION

Figure 1:
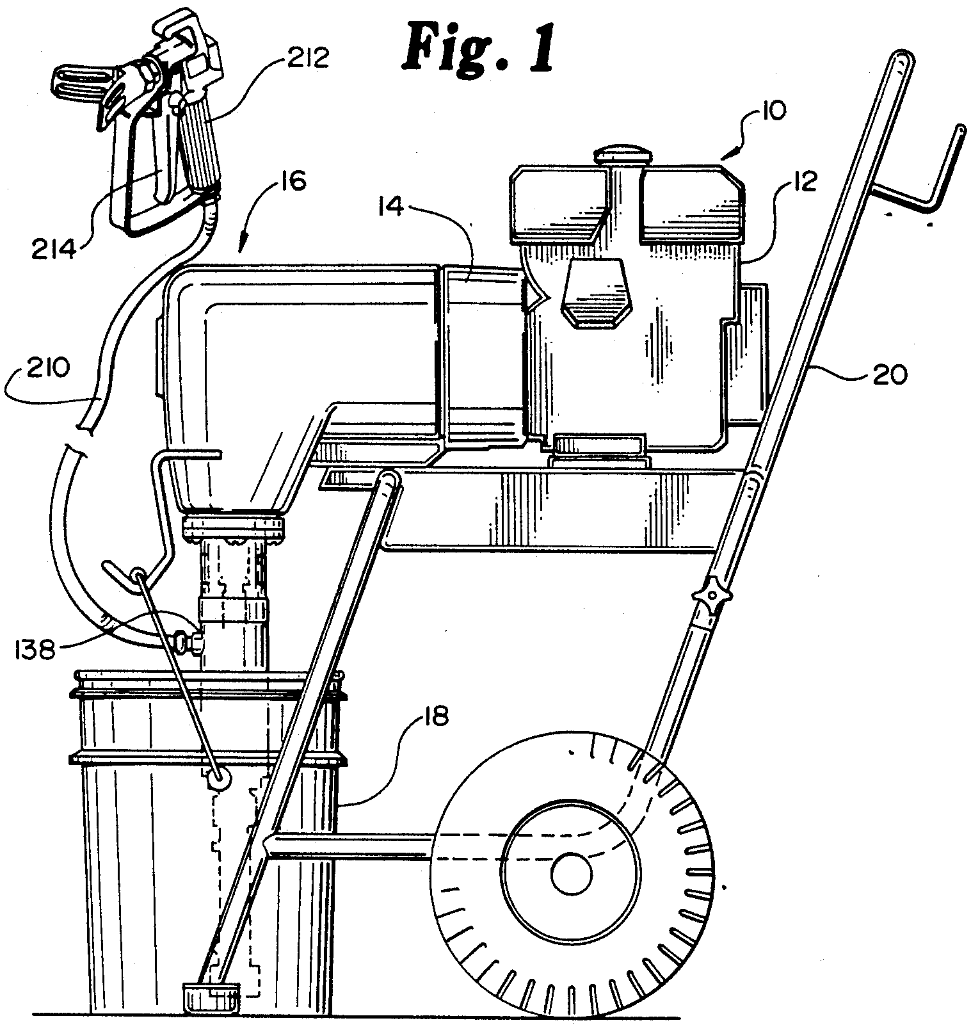
FIG. 1 is a side elevation view of portable spray painting equipment in which the present invention is useful.

Referring now to FIG. 1, portable spray painting equipment 10 may be seen. Equipment 10 preferably has a prime mover such as an internal combustion engine 12 and clutch 14 driving a piston type paint pump 16 adapted to draw paint from a container or paint bucket 18. Equipment 10 is preferably mounted to and carried by a wheeled cart 20. It is to be understood that gasoline engine 12 and clutch 14 may be replaced by an electric motor or another suitable prime mover (not shown) to drive pump 16. Paint is supplied via an outlet fitting 138, and flexible hose 210 to a paint spray gun 212 having an on/off trigger 214.

It is to be understood that once painting is completed, solvent is ordinarily flushed through paint pump 16, hose 210 and gun 212 to clean paint from these items. Such flushing is not always adequate to completely clean paint from equipment 10, and furthermore, it is sometimes necessary to get access to the interior, paint-contacting surfaces of pump 18. Furthermore, because of the limitations of prior art systems, the use of a single type of seal resulted in less than ideal matching of the seal to the paint or other material to be pumped, and oftentimes required return of all or a portion of pump 16 to a service center or to the factory for repair and replacement of parts.

Figure 2:
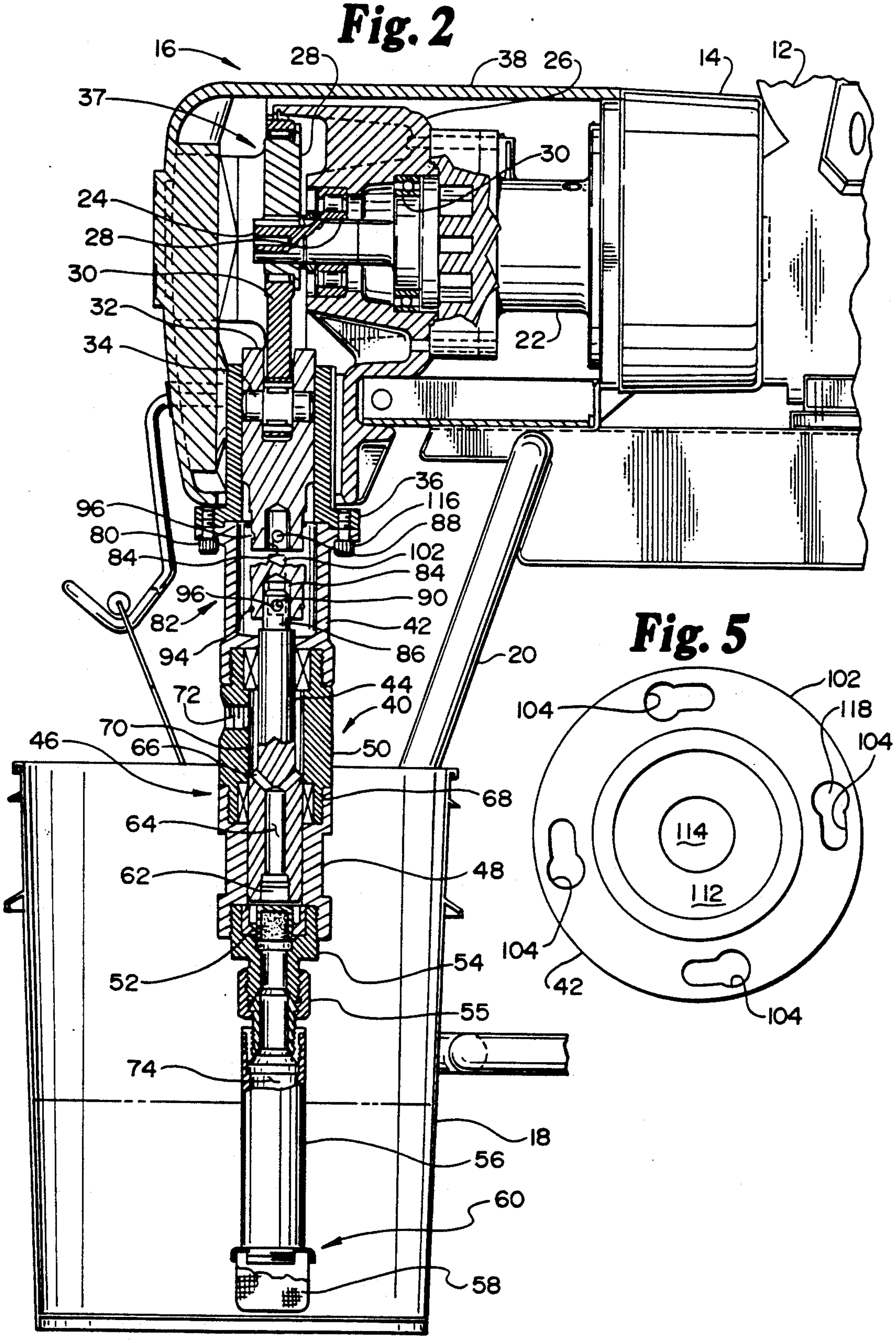
FIG. 2 is a partial section view of a portion of FIG. 1, illustrating the present invention.

Referring now to FIG. 2, pump 16 preferably includes a gear reducer 22 connected to the output of clutch 14 (or to the electric motor, not shown). Reducer 22 has an output shaft 24 carried in a drive housing 26, preferably by anti-friction bearings 28, 29. Shaft 24 is preferably keyed to and drives an eccentric 28 which is rotatably coupled to a crank arm 30. Crank arm 30 is pivotably coupled to a slide 32 via a wrist pin 34. Slide 32 is preferably carried in a slide housing 36 secured to drive housing 26. A removeable drive housing cover 38 provides protection for the driving means 37 made up of the shaft 24, eccentric 28, and crank arm 30 and permits access to such parts upon removal of cover 38 from equipment 10.

A fluid section assembly 40 is preferably mounted to the driving means 37 via a quick-change fluid section mounting flange 42. Fluid section assembly 40 includes a reciprocable piston 44 carried in a fluid section housing 46. Fluid section housing 46 is made up of an inlet portion 48 and an outlet portion 50. An inlet check valve 52 is carried by an inlet check valve housing 54 which is coupled to a suction tube 56 having a strainer 58 at its inlet end 60. Piston 44 preferably carries an outlet check valve 62 and has an internal passageway 64 coupled via a plurality of channels 66, 68 to an annular outlet chamber 70 in communication with an outlet port 72.

It is to be understood that suction tube 56 and inlet check valve housing 54 have communicating internal bores forming an inlet passageway 74.

Figure 6:
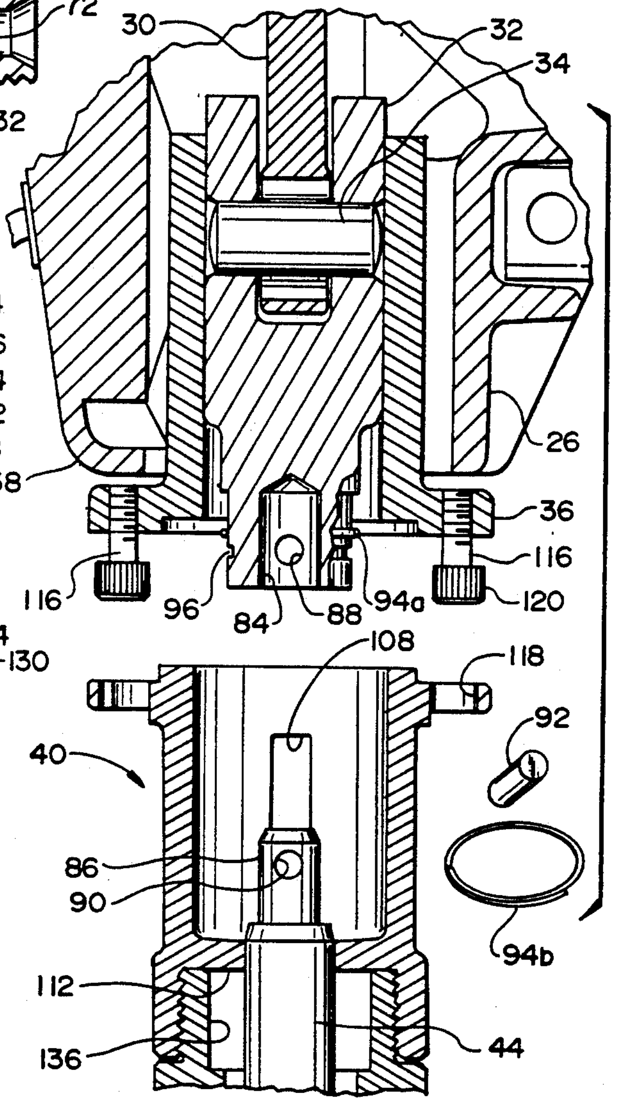
FIG. 6 is a partially exploded section view of a portion of FIG. 2.

FIG. 2 shows slide 32 both in an upper or retracted position 80 and also shows a partial section view of slide 32 coupled to piston 44 in a lower or extended position 82. Referring now also to FIG. 6, slide 32 preferably has an internal axial bore 84 which receives an axial extension 86 of piston 44. Slide 32 also has a transverse or diametral bore 88. Bore 88 may be aligned with a similar transverse or diametral bore 90 in extension 86 when extension 86 is received in bore 84 of slide 32. Slide 32 and piston 44 are coupled together for bi-directional reciprocation by a connecting pin 92 when pin 92 is received in bores 88, 90. Pin 92 is retained in bores 88, 90 by a wire retaining clip received in a circumferential groove 96 which intersects bore 88.

Figure 3:
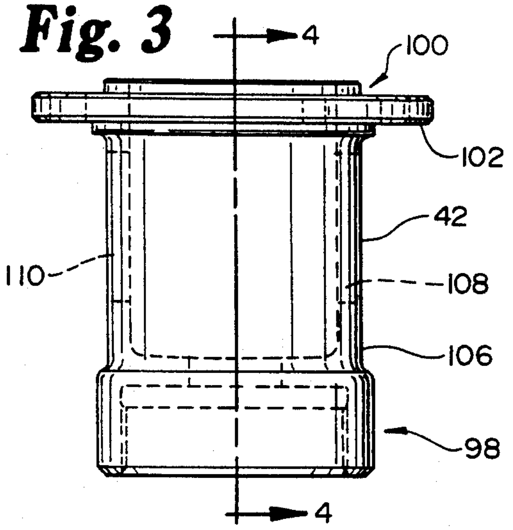
FIG. 3 is a side view of a quick-change mounting flange useful in the practice of the present invention.
Figure 4:
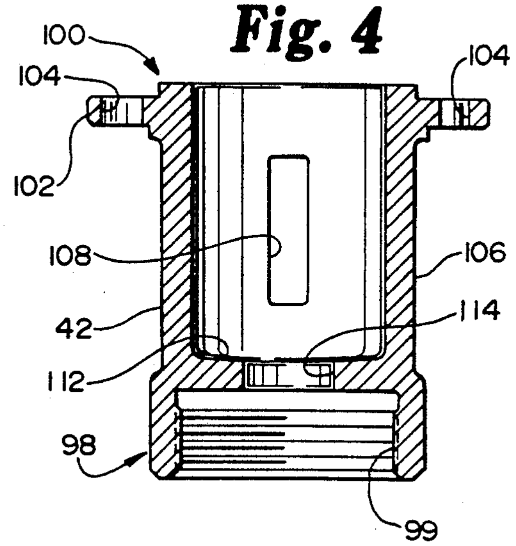
FIG. 4 is a section view taken along line 4—4 of FIG. 3.

Referring now more particularly to FIGS. 3–5, certain details of the mounting flange 42 may be seen. Flange 42 has a first end 98 carrying a threaded axial bore 99. Flange 42 also has a second end 100 having a radially outwardly directed lip 102 having a plurality of keyhole-shaped axially oriented apertures 104 which extend through lip 102. Flange 42 further has an elongated generally cylindrical wall section 106 between first and second ends 98, 100. Wall section 106 has diametrically opposed, radially-oriented apertures 108, 110 therethrough. Flange 42 further has an interiorly directed lip 112 having a bore 114 therethrough.

Referring now more particularly again to FIGS. 2 and 6, the fluid section assembly 40 may be removed from the driving means 37 by moving clip 94 out from diametral interference with diametral bores 88, 90 such that pin 92 may be removed through aperture 108 as is shown in FIG. 6. Clip 94 may be moved along slide 32 as is shown at position 94*a*, or it may be completely removed, as indicated at 94*b*. Next, each of the plurality of threaded fasteners 116 is loosened; flange 42 is rotated with respect to slide housing 36 such that the enlarged portions 118 (See FIG. 5) of bores or apertures 104 are aligned with the enlarged heads 120 of fasteners 116. Fluid section assembly 40 is then axially displaced away from the driving means 37 and can be serviced or repaired with only one loose part, pin 92, separate from what are now two subassemblies of equipment 10. Flange 42 may now be removed by unthreading it from the remainder of fluid section assembly 40. In addition, suction tube 56 may be separated from the other end of fluid section assembly 40 by unscrewing a cap 55 from housing 54.

Figure 7:
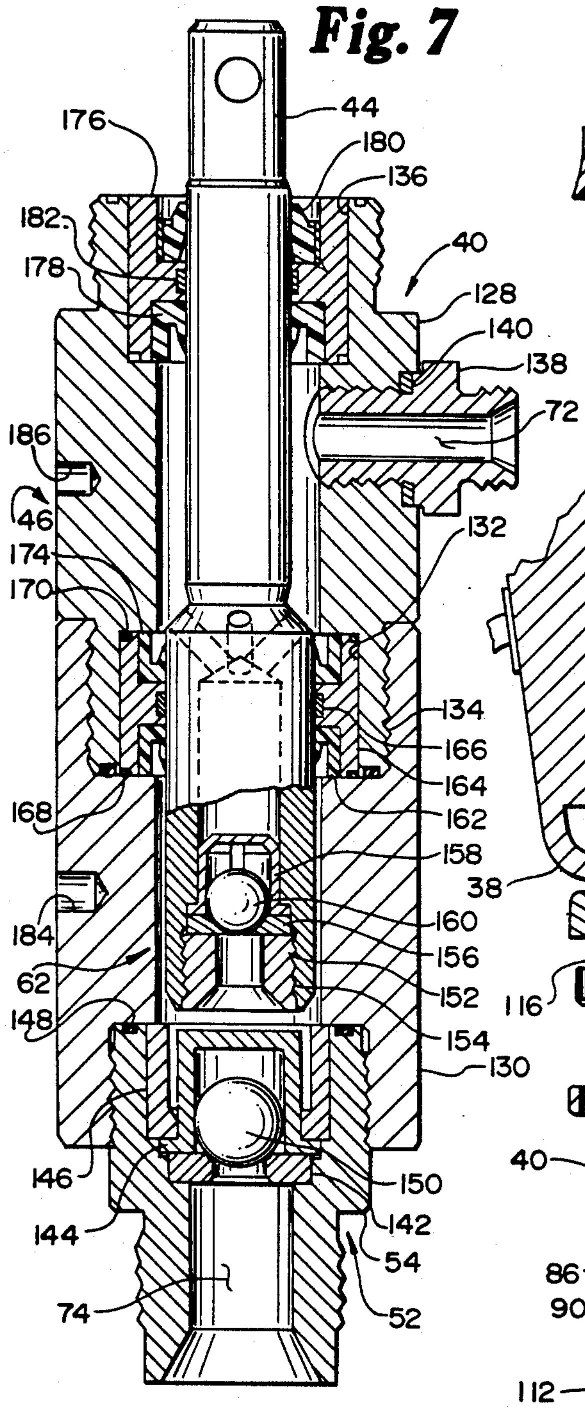
FIG. 7 is a section view of the fluid section assembly of the present invention utilizing lip type seals.

The fluid section assembly 40 will then appear as shown in FIG. 7. FIG. 7 shows a first embodiment of the fluid section assembly 40 utilizing a "U" cup type or lip type seals which have been found to provide longer life with latex type paints.

Figure 9:
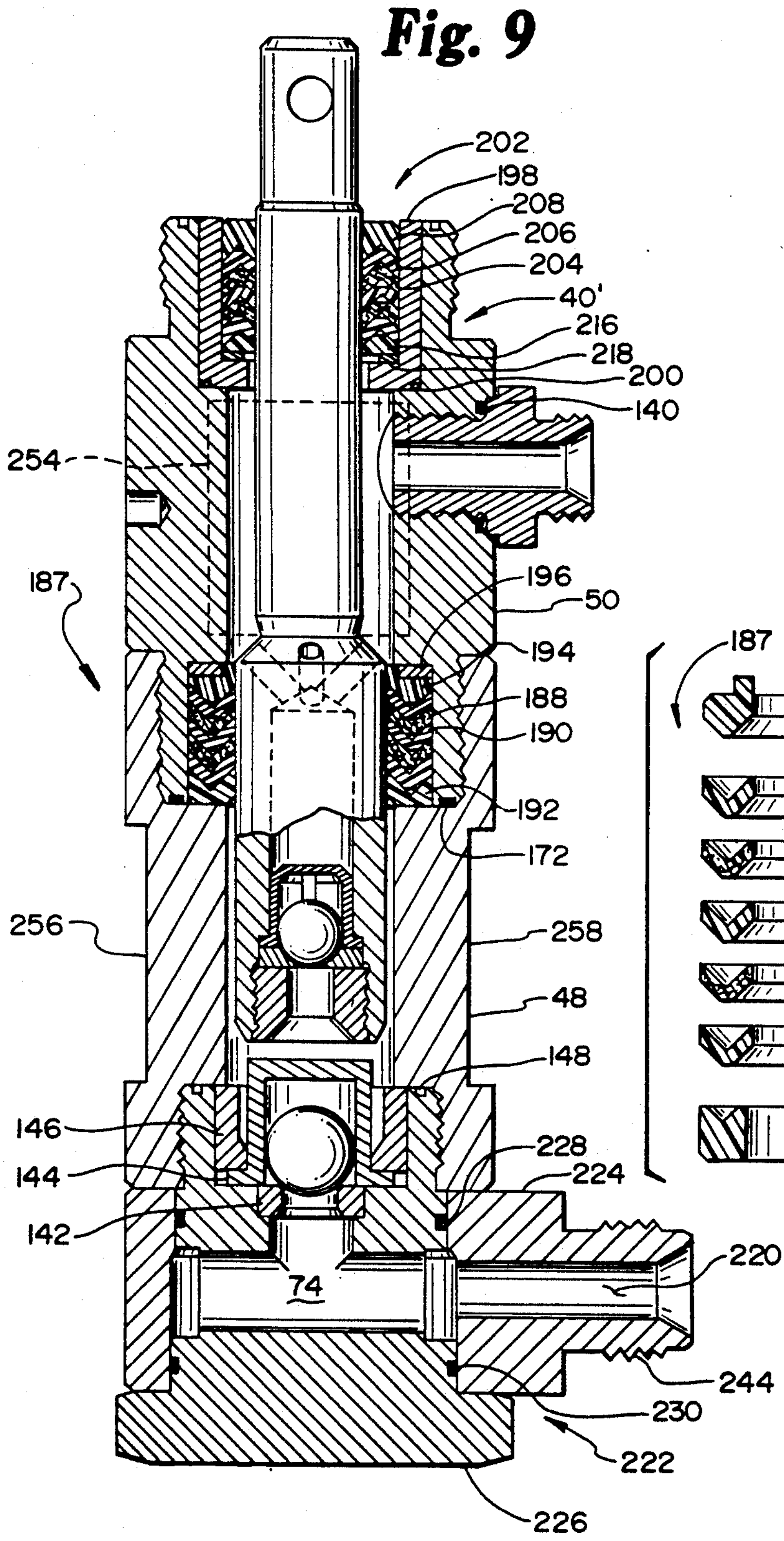
FIG. 9 is a section view of the fluid section assembly of the present invention utilizing a pair of packing sets and an alternative inlet fitting assembly.
Figure 10:
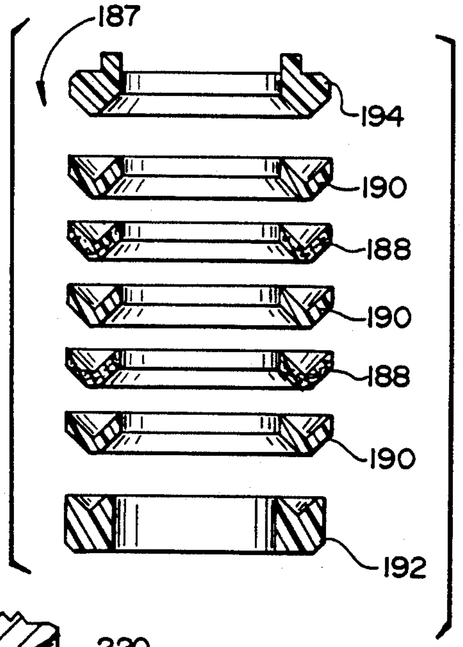
FIG. 10 is an exploded view of a packing set useful in the practice of the invention according to the embodiment shown in FIG. 9.
Figure 11:
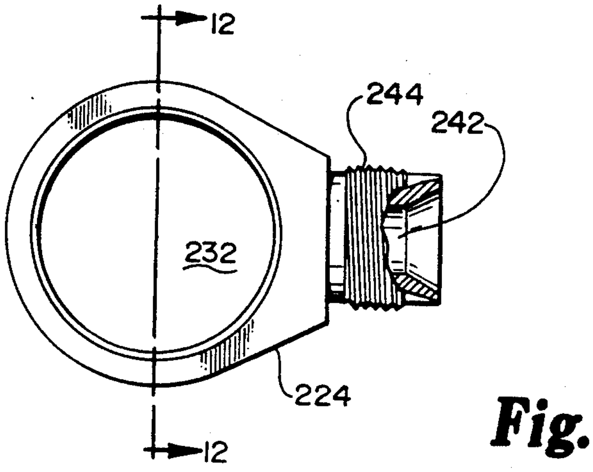
FIG. 11 is a top view of a inlet fitting yoke useful in the practice of the present invention in connection with the embodiment shown in FIG. 9.
Figure 13:
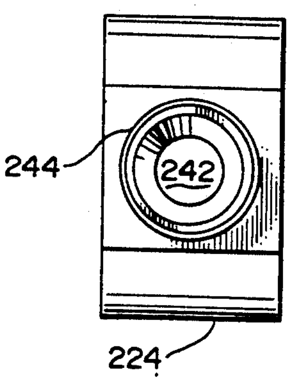
FIG. 13 is an end view of the yoke of FIG. 11.
Figure 12:
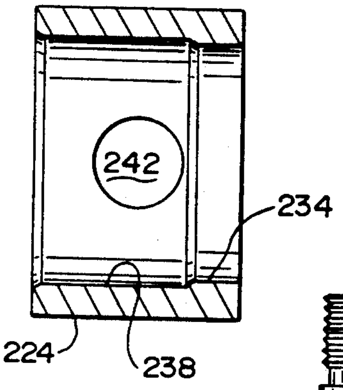
FIG. 12 is a section view taken along line 12—12 of FIG. 11.

Because such lip seals are more costly than V-ring packings, it has been found desirable to also permit the fluid section assembly 40 to use V-ring packings as shown in FIG. 9. It is important to note that the fluid section assembly 40 of the present invention may be converted between packing sets and lip type seals, and that such conversion may be accomplished in the field by a paint equipment operator, for example during overnight cleaning or daily maintenance of equipment 10. Furthermore, by providing for the simple and easy removal of fluid section assembly 40 from the driving means 37 painting equipment operators may find it desirable to have one or more spare fluid section assemblies 40 available in the event of a malfunction in the fluid section assembly 40 or to rapidly convert the equipment 10 from latex paint to oil-based paint or lacquer with which the packing type seals are preferred. To replace the seals it is only necessary to remove the fluid section assembly from the driving means, and then unscrew a mounting flange and two housing portions from each other to gain direct and immediate access to the seals.

It has also been found to be useful to have an option to provide a straight-line fluid section assembly 40 to accommodate an in-line suction tube 56 as indicated in FIGS. 1 and 2 and also it has been found desirable to provide for a swivel type inlet fitting 122 as shown in FIG. 9 to provide for drawing paint from containers substantially larger than container 18. In such a case, a flexible suction tube (not shown) is preferably secured to threads 244 on a rotating yoke or collar 224, with the other end of the flexible suction tube (not shown) leading to, for example, a 55 gallon drum or other container (not shown) of paint or other material to be pumped by equipment 10.

Returning now to FIG. 7, fluid section assembly 40 includes piston 44 and an upper cylinder or outlet portion 50 of fluid section housing 46. Housing 46 also has a lower cylinder or inlet portion 48. Fluid section housing 46 thus is bifurcated or split in two parts and surrounds piston 44 and further has a first cylindrical annular recess 132 between housing 46 and piston 44 defined by inlet and outlet portions 48, 50. Upper cylinder 50 and lower cylinder 48 are preferably detachably secured together by interengaging threads 134.

As may be seen most clearly in FIG. 6, there is a second cylindrical recess 136 between upper cylinder 128 and piston 44. Upper or second cylindrical recess 136 is preferably enclosed, in part, by inwardly directed lip 112 on flange 42.

Referring now again to FIG. 7, outlet portion 50 of fluid section housing 46 preferably has an outlet fitting 138 in outlet port 72 and is sealed by a copper gasket or seal in the form of a washer 140. Inlet check valve housing 54 carries an inlet check valve seat 142 and an inlet ball guide or cage 144 retained by an inlet sleeve 146. An 0-ring 148 preferably seals housing 54 to housing section 48. A ball 150 acts as a check valve element for inlet check valve 52.

Referring now to the outlet check valve 62 in piston 44, a retainer nut 152 is preferably secured to piston 44 via threads 154. Nut 152 supports the outlet check valve seat 156, the outlet ball guide 158 and outlet check valve ball or element 160.

Figure 8:
FIG. 8 is a partially cut away side view of a lip type seal guide useful in the embodiment shown in FIG. 7.

It is to be understood that the inlet check valve 52 is open and the outlet check valve 62 is closed during upward movement of piston 44, and that the inlet check valve 52 is closed and the outlet check valve 62 is open during downward movement of piston 44, thus pumping paint from inlet passageway 74 to outlet port 72 during both upward and downward strokes of piston 44. Because paint at outlet 72 is at substantially higher pressure than paint at inlet 74, it is necessary that there be effective sealing between piston 44 and the housing 46 made up of inlet portion 48 and outlet portion 50. It is also necessary that piston 44 be sealed against outlet portion 50 in the area where piston 44 exits housing 46. First and second recesses 132, 136 provide respective annular spaces for such sealing means. In the embodiment shown in FIG. 7, a lip seal 162 such as that shown in FIG. 8 and as available from the A. W. Chesterton Co., Stoneham, Ma 02180 as a type 10000 series monoseal may be utilized as the sealing means. Lip seal 162 is preferably held in place by a seal carrier 164. Carrier 164 may have a wear ring 166 of Teflon fluorine-containing resin or other suitable material. Alternatively, wear ring 166 may be omitted. Seal carrier 164 is preferably sealed to housing 46 portions 48, 50 by O-rings 168, 170. In the first recess 132, it has been found preferable to use a second lip seal 174 identical to the first lip seal 162.

A similar seal carrier 176 having a wear ring 182 and additional lip seal 178 may be utilized at the second recess 136. A conventional wiper 180 may be used to exclude external contaminants from the interior of assembly 40. Alternatively, wiper 180 may be eliminated for cost savings, as may wear ring 182 in carrier 176.

Although it is desirable to minimize the special tools required for disassembly of equipment 10, it may be desirable to restrict access to the interior of fluid section assembly 40, for example to those having special training and replacement components, and to carry out such purposes, a pair of blind bores 184, 186 are formed in inlet and outlet portions 48, 50 respectively. Bores 184, 186 are each adapted to receive a single-toothed spanner wrench to disassemble fluid section assembly 40. Alternatively, if it is not desired to restrict access, each of the inlet and outlet portions 48, 50 of housing 46 may be equipped with wrench flats or hexagonal or other open-end wrench/engaging surfaces as are conventionally known to separate two parts threaded together.

Referring now more particularly to FIG. 9, an alternative embodiment of fluid section assembly 40' may be seen. In this embodiment, the sealing means are provided by a packing set 187 made up of alternating leather and elastomer V-rings. The elastomer V-rings are preferably ultra high molecular weight polyethylene type rings. The leather V-ring 188 and the elastomer V-rings 190 are preferably compressed between a support ring 192 and a pressure ring 194. Support ring 192 and pressure ring 194 are preferably formed of Delrin acetal plastic as available from E. I. DuPont de Nemours Co. Alternatively, supper ring 192 may be made of reinforced Delrin acetal plastic or steel. Compression is applied to packing set 187 by a wave washer spring 196.

In second recess 136, it has been found preferable to utilize a packing sleeve 198 sealed by an O-ring 200. The second packing set 202 preferably includes a similar stack of alternating leather and elastomer V-rings 204, 206, which are preferably retained between a second support ring 208 and second pressure ring 216 and compressed by a second wave washer 218.

It is to be understood that the embodiment of FIG. 9 can be utilized with the inlet check valve housing 54 shown in FIG. 7. FIG. 9 shows an alternative inlet fitting 222 which provides for both a right angle entry and a degree of freedom to permit the inlet port 220 to swivel or rotate around fluid section assembly 40'. It is further to be understood that pivoting inlet fitting 222 can be utilized in place of the inline inlet fitting 54 with the lip seal fluid section assembly 40 of FIG. 7. In addition, FIG. 9 shows wrench flat 254 on outlet portion 50 of housing 46 and flats 256, 258 on inlet portion 48, replacing bores 184, 186.

Figure 15:
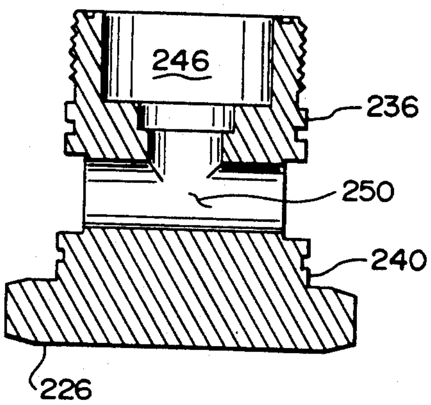
FIG. 15 is a section view taken along line 15—15 of FIG. 14.
Figure 14:
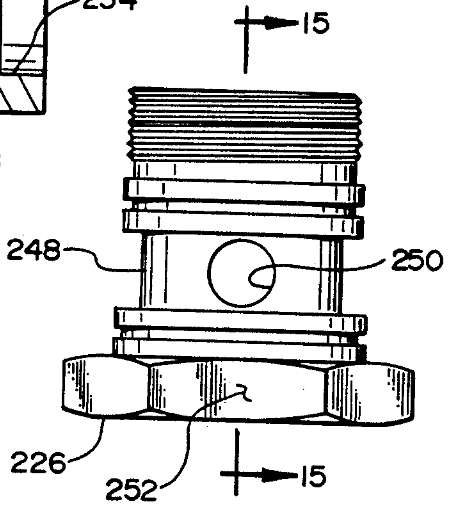
FIG. 14 is an inlet fitting post useful in the practice of the present invention according to the embodiment shown in FIG. 9.
Figure 16:
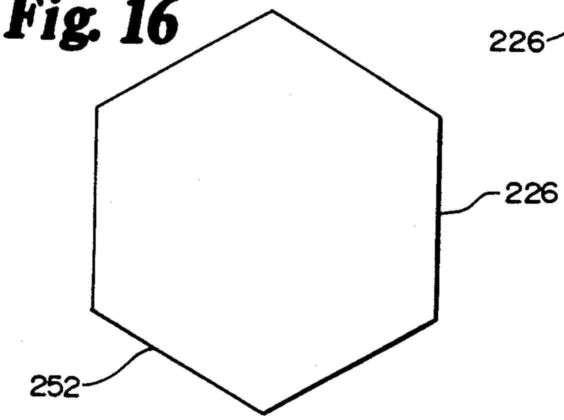
FIG. 16 is a bottom view of the post of FIG. 14.

Refer now also to FIGS. 11-16, in addition to FIG. 9, pivoting fluid inlet fitting 222 preferably has a yoke 224 (shown in FIGS. 11, 12 and 13) and a post 226 (shown in FIGS. 14, 15 and 16).

Yoke or cover 224 is received on post 226 and the combination is then threaded into inlet portion 48 and sealed against leakage by 0-ring 148. Yoke 224 is sealed against leakage by 0-rings 228, 230 which, at the same time permit yoke 224 to rotate on post 226.

Yoke 224 preferably has a stepped bore 232 having a first inner diametral surface 234 having a clearance fit with a first diametral land 236 on post 226. Bore 232 also has a second inner diametral surface 238 sized to mate in a clearance fit with a second diametral land 240 on post 226. It is also to be understood that bore 232 is in communication with a transverse bore 242 in yoke 224, and that yoke 224 preferably has external threads 244 for coupling to a flexible syphon or suction inlet hose (not shown).

Post 226 preferably has an internal configuration of a stepped bore 246, preferably identical to the corresponding internal configuration of inlet check valve housing 54. This internal configuration 246 supports the check valve seat 142, the inlet valve guide 144, and the inlet sleeve 146. Post 226 has a reduced diameter portion 248 having a through bore 250 in communication with stepped bore 246. Post 226 preferably has a hexagonal shaped end portion 252 to aid in attaching post 226 to inlet housing portion 48.

The invention is not to be taken as limited to all of the details thereof as modifications and variations thereof may be made without departing from the spirit or scope of the invention.

What is claimed is:

1. In a piston pump of the type having driving means carried in a drive housing and coupled to a double acting piston axially reciprocable in a fluid section housing, an improved fluid section coupling and mounting apparatus comprising:

a) a fluid section mounting flange having
   i) a first end carrying a threaded axial bore for engagement with a threaded end of a fluid section housing,
   ii) a second end having a radially outwardly directed lip having a plurality of keyhole-shaped axially-oriented apertures therethrough, and
   iii) an elongated generally cylindrical wall section between said first and second ends having diametrically opposed radially-oriented apertures therethrough;

b) a reciprocable coupling means for connecting the driving means to the piston to reciprocate the piston with respect to the housing, the coupling means comprising:
   i) an axially oriented cylindrical section of the driving means having both axial and diametral bores therein,
   ii) an axially projecting extension at a first end of the piston and having a diametral bore therethrough,
   iii) a connecting pin simultaneously transversely received in the diametral bores of the cylindrical section of the driving means and the piston extension such that when the piston extension is received in the axial bore of the cylindrical section such that the driving means is coupled to the piston for bidirectional reciprocation, and
   iv) pin retaining means for retaining the connecting pin in the diametral bores.

2. The apparatus of claim 1 wherein the flange is selectively securable to the slide housing by a plurality of threaded fasteners threadably received in the pump frame and projecting through the keyhole-shaped apertures in the flange lip.

3. The apparatus of claim 1 wherein the cylindrical section has a circumferential groove intersecting the diametral bore of the cylindrical section and the pin retaining means comprises a circumferential wire clip received in the groove such that the pin is retained in simultaneous engagement with the cylindrical section and the piston shaft.

4. The apparatus of claim 3 wherein the wire clip and pin are each accessible through one of the diametrically-opposed apertures in the flange wall section such that the clip is axially displaceable away from intersecting the diametral bore of the cylindrical section and the pin is thereafter transversely displaceable to decouple the cylindrical section and the piston extension.

5. The apparatus of claim 1 wherein the fluid section housing has an open-ended annular recess at the threaded end thereof and the flange further has an inwardly directed lip adjacent the threaded axial bore in the first end of the flange defining an end wall for the open-ended annular recess in the fluid section housing and disengagement of the flange and fluid section housing provides immediate and direct access to the open-ended annular recess.

6. The apparatus of claim 5 further comprising end sealing means in the open-ended annular recess for sealing the piston to the housing.

7. The paint pump assembly of claim 6 wherein the end sealing means comprises an end packing set having a plurality of alternating leather and elastomer V-ring packings.

8. The paint pump assembly of claim 7 wherein the elastomer V-rings of the end packing set are formed of ultra-high molecular weight polyethylene.

9. The paint pump assembly of claim 8 wherein the plurality of end V-ring packing have an elastomer element adjacent to a high-pressure end of the end packing set.

10. The paint pump assembly of claim 6 wherein the end sealing means comprises an elastomer lip end seal and a metal end seal carrier.

11. The paint pump assembly of claim 10 wherein the end sealing means further comprises an elastomer wiper carried by the metal end seal carrier.

12. The paint pump assembly of claim 11 wherein the metal end seal carrier has a wear ring formed of teflon in contact with the piston.

* * * * *